US012619892B2

(12) United States Patent

Ezrielev et al.

(10) Patent No.: US 12,619,892 B2
(45) Date of Patent: May 5, 2026

(54) SYSTEM AND METHOD FOR MANAGING INFERENCE MODEL PERFORMANCE THROUGH PROACTIVE COMMUNICATION SYSTEM ANALYSIS

(71) Applicant: Dell Products L.P., Round Rock, TX (US)

(72) Inventors: Ofir Ezrielev, Beer Sheva (IL); Jehuda Shemer, Kfar Saba (IL); Tomer Kushnir, Omer (IL)

(73) Assignee: Dell Products L.P., Round Rock, TX (US)

( * ) Notice: Subject to any disclaimer, the term of this patent is extended or adjusted under 35 U.S.C. 154(b) by 730 days.

(21) Appl. No.: 18/060,122

(22) Filed: Nov. 30, 2022

(65) Prior Publication Data

US 2024/0177027 A1      May 30, 2024

(51) Int. Cl.
*G06N 5/043* (2023.01)
*H04L 41/14* (2022.01)

(52) U.S. Cl.
CPC ........... *G06N 5/043* (2013.01); *H04L 41/145* (2013.01)

(58) Field of Classification Search
None
See application file for complete search history.

(56) References Cited

U.S. PATENT DOCUMENTS 7,593,729 B2 * 9/2009 Barak ................... H04L 1/0026
                                                                725/62
10,142,174 B2 11/2018 Yang et al.

<table>
<tr><td>10,341,354 B2</td><td>7/2019</td><td>Murugesan et al.</td><td></td></tr>
<tr><td>10,853,129 B1</td><td>12/2020</td><td>Sengupta</td><td></td></tr>
<tr><td>11,216,482 B2</td><td>1/2022</td><td>Khillar et al.</td><td></td></tr>
<tr><td>11,886,960 B2 *</td><td>1/2024</td><td>Kaufmann ..............</td><td>G06N 20/00</td></tr>
<tr><td>2008/0256167 A1</td><td>10/2008</td><td>Branson</td><td></td></tr>
<tr><td>2016/0098297 A1</td><td>4/2016</td><td>Yuyitung</td><td></td></tr>
<tr><td>2018/0365576 A1</td><td>12/2018</td><td>Guttmann</td><td></td></tr>
<tr><td>2019/0050505 A1</td><td>2/2019</td><td>Nendorf</td><td></td></tr>
</table>

(Continued)

OTHER PUBLICATIONS

Liang et al., Model-driven Cluster Resource Management for AI Workloads in Edge Clouds; arXiv:2201.07312v1 [cs.DC] Jan. 18, 2022; Total pp. 23 (Year: 2022).*

(Continued)

*Primary Examiner* — Alan Chen
(74) *Attorney, Agent, or Firm* — WOMBLE BOND DICKINSON (US) LLP

(57) ABSTRACT

Methods and systems for managing execution of inference models hosted by data processing systems are disclosed. To manage execution of inference models hosted by data processing systems, a system may include an inference model manager and any number of data processing systems. The inference model manager may communication system data for the communication system linking the data processing systems. The inference model manager may use the communication system data to determine whether the communication system meets inference generation requirements of the downstream consumer. If the communication system does not meet inference generation requirements of the downstream consumer, the inference model manager may obtain an inference generation plan to return to compliance with the inference generation requirements of the downstream consumer.

20 Claims, 11 Drawing Sheets

(56) References Cited

U.S. PATENT DOCUMENTS

| | | | |
|---|---|---|---|
| 2019/0102700 | A1 | 4/2019 | Babu |
| 2019/0266504 | A1 | 8/2019 | Apparao |
| 2020/0027157 | A1 | 1/2020 | Xu |
| 2020/0104749 | A1 | 4/2020 | Sartorello |
| 2020/0145448 | A1 | 5/2020 | Vu |
| 2020/0193313 | A1 | 6/2020 | Ghanta |
| 2020/0219007 | A1 | 7/2020 | Byers |
| 2021/0255886 | A1 | 8/2021 | Von Niederhausern |
| 2021/0319098 | A1 | 10/2021 | Pogorelik |
| 2022/0036160 | A1 | 2/2022 | Sasagawa |
| 2022/0156368 | A1 | 5/2022 | Spyridopoulos |
| 2022/0269835 | A1 | 8/2022 | Yang |
| 2022/0414503 | A1 | 12/2022 | Park |
| 2023/0010769 | A1 | 1/2023 | Umezawa |
| 2023/0012487 | A1 | 1/2023 | Makaya |
| 2023/0168932 | A1 | 6/2023 | Rafferty |
| 2023/0168950 | A1 | 6/2023 | Lee |
| 2023/0252328 | A1 | 8/2023 | Swami |
| 2023/0267344 | A1 | 8/2023 | Chang |
| 2023/0273813 | A1 | 8/2023 | Fong |
| 2023/0342203 | A1 | 10/2023 | Yang |
| 2024/0020296 | A1 | 1/2024 | Ezrielev |
| 2024/0020555 | A1 | 1/2024 | Ezrielev |
| 2025/0030766 | A1 | 1/2025 | Dubey |
| 2025/0265383 | A1 | 8/2025 | Nendorf |

OTHER PUBLICATIONS

Filho et al., A Systematic Literature Review on Distributed Machine Learning in Edge Computing; Sensors 2022, 22, 2665. https://doi.org/10.3390/s22072665; Published Mar. 23, 2022; Total pp. 36 (Year: 2022).*

Shi et al., Communication-Efficient Edge AI: Algorithms and Systems; arXiv:2002.09668v1 [cs.IT] Feb. 22, 2020; Total pp. 24 (Year: 2020).*

Mao et al., A Survey on Mobile Edge Computing: The Communication Perspective; arXiv:1701.01090v4 [cs.IT] Jun. 13, 2017; Total pp. 37 (Year: 2017).*

"Software performance testing", Wikipedia, Wikimedia Foundation, https://en.wikipedia.org/wiki/Software_performance_testing (8 Pages).

"The Ultimate Guide to Performance Testing and Software Testing: Testing Types, Performance Testing Steps, Best Practices, and More", Stackify, Apr. 16, 2021, https://stackify.com/ultimate-guide-performance-testing-and-software-testing/ (23 Pages).

"High availability software", Wikipedia, Wikimedia Foundation, https://en.wikipedia.org/wiki/High_availability_software (5 Pages).

"Load balancing (computing)", Wikipedia, Wikimedia Foundation, https://en.wikipedia.org/wiki/Load_balancing_(computing) (17 Pages).

Thompson, Julie D. et al., "Multiple Sequence Alignment Using ClustalW and ClustalX", Current Protocols in Bioinformatics (2003) 2.3.1-2.3.22 (22 Pages).

Zhao, Shixiong et al., "HAMS: High Availability for Distributed Machine Learning Service Graphs", 2020 50th Annual IEEE/IFIP International Conference on Dependable Systems and Networks (DSN). IEEE, 2020 (13 Pages).

Hu, Chenghao et al., "Distributed Inference with Deep Learning Models across Heterogeneous Edge Devices." IEEE Infocom 2022—IEEE Conference on Computer Communications. IEEE, 2022 (8 Pages).

Eck, B., Fusco, F., Gormally, R., Purcell, M., & Tirupathi, S. (Mar. 24, 2020). "Scalable deployment of AI time-series models for IoT." arXiv preprint arXiv:2003.12141. (7 pages).

Chen, B., Eck, B., Fusco, F., Gormally, R., Purcell, M., Sinn, M, & Tirupathi, S. (Nov. 2018). "Castor: Contextual IoT time series data and model management at scale." In 2018 IEEE International Conference on Data Mining Workshops (ICDMW) (pp. 1487-1492). IEEE. Retrieved from <https://arxiv.org/pdf/1811.08566> on Oct. 10, 2025. (6 pages)

Saeed et al., "Model Adaptation and Personalization for Physiological Stress Detection." Oct. 2018. (Year: 2018) Retrieved from <https://tstojan.github.io/pub/DSAA2018_ModelAdaptandPersonPhysiologicaStressDetection.pdf> on Oct. 13, 2025. (8 pages).

Zhang et al., "Bandwidth-Efficient Multi-Task AI Inference with Dynamic Task Importance for the Internet of Things in 4 Edge Computing." Aug. 2022. (Year: 2022) (13 pages).

Abadi, Martin et al. (Mar. 16, 2016). "TensorFlow: Large-Scale machine learning on heterogeneous distributed systems." arXiv.org. <https://arxiv.org/abs/1603.04467> (19 pages).

* cited by examiner

SYSTEM AND METHOD FOR MANAGING INFERENCE MODEL PERFORMANCE THROUGH PROACTIVE COMMUNICATION SYSTEM ANALYSIS

FIELD

Embodiments disclosed herein relate generally to inference generation. More particularly, embodiments disclosed herein relate to systems and methods to manage inference generation based on inference consumer expectations.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements

DETAILED DESCRIPTION

Figure 1:
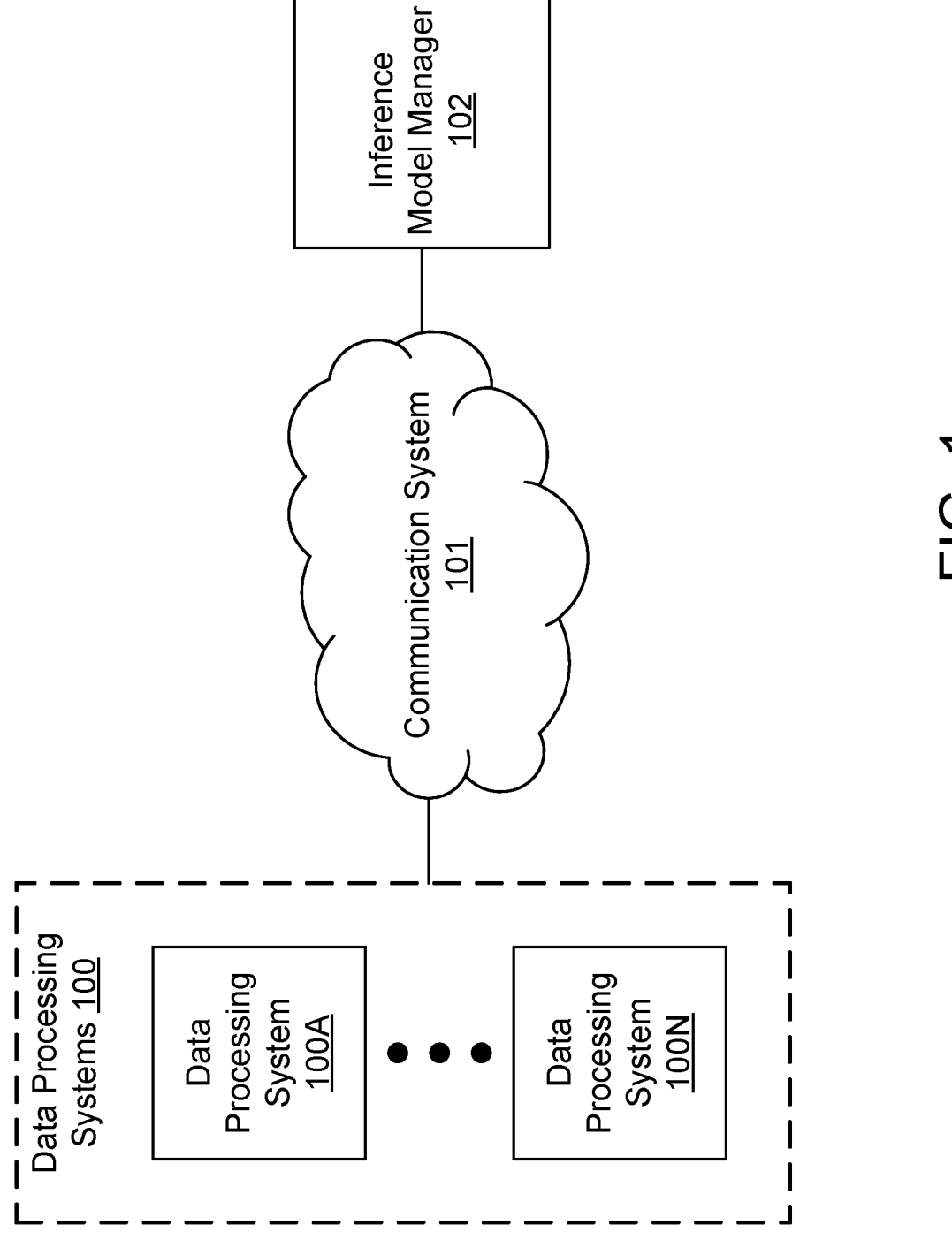
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing execution of an inference model throughout a distributed environment. To manage execution of the inference model, the system may include an inference model manager and any number of data processing systems. Hosting and executing an inference model by one data processing system may consume undesirable quantities of computing resources of the data processing system (and/or the data processing system may include insufficient resources to host the inference model).

To reduce computing resource consumption, the inference model manager may partition the inference model into portions and distribute the portions across multiple data processing systems. The inference model hosted by the multiple data processing systems may generate inferences usable by a downstream consumer. The speed and reliability of inference generation by the multiple data processing systems may affect the downstream consumer's ability to utilize the inferences to make decisions (and/or other uses). The speed and reliability of inference generation may depend, at least in part, on a communication system (e.g., a wireless point-to-point connection) between the multiple data processing systems. However, disruptions to the communication system may (temporarily or permanently) affect the speed and/or reliability of inference generation by the multiple data processing systems, thereby making it difficult for the downstream consumer to depend on the inferences generated by the multiple data processing systems.

To meet inference generation requirements of the downstream consumer, the inference model manager may dynamically modify an inference generation path (e.g., an ordered selection of the data processing systems involved in inference generation) to adjust the speed and/or reliability of inference generation throughout the distributed environment. To do so, the inference model manager may obtain communication system information and may determine a current speed and reliability of inference generation by the data processing systems based on the communication system information. The inference model manager may compare the current speed and reliability of inference generation to inference generation requirements of the downstream consumer. The inference generation requirements of the downstream consumer may indicate thresholds for speed and reliability of inference generation by the inference model. If the current speed and reliability of inference generation does not meet the inference generation requirements of the downstream consumer, the inference model manager may modify the deployment of the inference model to support eventual compliance with the inference generation requirements of the downstream consumer.

Thus, embodiments disclosed herein may provide an improved system for managing availability of inferences generated by an inference model to a downstream consumer of the inferences. The improved system may monitor a communication system connecting the data processing systems and may respond to changes in the availability of the inferences to support continued compliance with the inference generation needs of the downstream consumer over time. By managing the deployment of the inference model, a system in accordance with embodiments disclosed herein may re-assign data processing systems to obtain an inference generation path such that the downstream consumer may more assuredly rely on at least the services provided by the inference model. By doing so, the availability of inferences to the downstream consumer may be adjusted dynamically, and the speed and the reliability of inference generation may be restored following disruptions to the communication system and/or changes to the inference generation requirements of a downstream consumer.

In an embodiment, a method for managing execution of an inference model hosted by data processing systems is provided. The method may include: obtaining communication system information for a communication system connecting the data processing systems; making a determination regarding whether the communication system information meets inference generation requirements of a downstream consumer; in an instance of the determination, in which the communication system information does not meet the inference generation requirements of the downstream consumer: obtaining an inference generation path for the inference model based on the inference generation requirements of the downstream consumer and the communication system information; and modifying a deployment of the inference model to the data processing systems based on the inference generation path.

The method may also include: prior to obtaining the communication system information: obtaining the inference model; obtaining characteristics of the inference model and characteristics of the data processing systems; obtaining the portions of the inference model based on the characteristics of the data processing systems and the characteristics of the inference model; obtaining an execution plan for the inference model based on: the portions of the inference model, the characteristics of the data processing systems, and the inference generation requirements of the downstream consumer; and distributing the portions of the inference model to the data processing systems based on the execution plan.

The communication system information may include: a quantity of available communication system bandwidth between each data processing system of the data processing systems; and a reliability of transmission between each data processing system of the data processing systems.

The reliability of transmission may be based on: historical data indicating the likelihood of successful transmission of data between each data processing system of the data processing systems; or a distance between each data processing system of the data processing systems.

The inference generation requirements of the downstream consumer may be based on: an inference generation speed threshold, and an inference generation reliability threshold.

The inference generation speed threshold may indicate a minimum quantity of communication bandwidth between each data processing system of the data processing systems to meet the inference generation requirements of the downstream consumer.

The inference generation reliability threshold may indicate a minimum likelihood of successful transmission of data between each data processing system of the data processing systems to meet the inference generation requirements of the downstream consumer.

The inference generation path may include: a listing of instances of each of the portions of the inference model usable to generate an inference model result in compliance with the inference generation requirements of the downstream consumer; and an ordering of the listing of the instances.

Modifying the deployment of the inference model may include: generating an updated execution plan based on the inference generation path; and distributing the updated execution plan to the data processing systems to implement the updated execution plan.

The communication system may include: multiple point-to-point wireless connections between the data processing systems, each point-to-point wireless connection of the multiple point-to-point wireless connections having distinct characteristics.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize inferences generated by executing inference models hosted by data processing systems throughout a distributed environment.

The system may include inference model manager 102. Inference model manager 102 may provide all, or a portion, of the computer-implemented services. For example, inference model manager 102 may provide computer-implemented services to users of inference model manager 102 and/or other computing devices operably connected to inference model manager 102. The computer-implemented services may include any type and quantity of services which may utilize, at least in part, inferences generated by the inference models hosted by the data processing systems throughout the distributed environment.

To facilitate execution of the inference models, the system may include one or more data processing systems 100. Data processing systems 100 may include any number of data processing systems (e.g., 100A-100N). For example, data processing systems 100 may include one data processing system (e.g., 100A) or multiple data processing systems (e.g., 100A-100N) that may independently and/or cooperatively facilitate the execution of the inference models.

For example, all, or a portion, of data processing systems 100 may provide computer-implemented services to users and/or other computing devices operably connected to data processing systems 100. The computer-implemented services may include any type and quantity of services including, for example, generation of a partial or complete processing result using an inference model of the inference models. Different data processing systems may provide similar and/or different computer-implemented services.

The quality of the computer-implemented services may depend on the accuracy of the inferences and, therefore, the complexity of the inference models. An inference model capable of generating accurate inferences may consume an undesirable quantity of computing resources during operation. The addition of a data processing system dedicated to hosting and operating an inference model may increase communication bandwidth consumption, power consumption, and/or computational overhead throughout the distributed environment. Therefore, the inference model may be partitioned into inference model portions and distributed across multiple data processing systems to utilize available computing resources more efficiently throughout the distributed environment.

Inferences generated by the inference model may be provided to a downstream consumer. The speed and reliability of inference generation may depend on a communication system connecting (e.g., via point-to-point wireless connections) data processing systems 100. Over time, the speed and/or reliability of inference generation by data processing systems 100 may change. The speed and/or reliability of the inference generation may change due to: (i) re-location of at least a portion of data processing systems 100, (ii) changes to ambient conditions surrounding at least a portion of data processing systems 100, and/or other changes. In addition, inference generation requirements of the downstream consumer may change over time and, therefore, a deployment of the inference model may no longer comply with inference generation requirements of the downstream consumer.

In general, embodiments disclosed herein may provide methods, systems, and/or devices for managing execution of an inference model hosted by data processing systems 100. To manage execution of the inference model hosted by data processing systems 100, a system in accordance with an embodiment may distribute portions of the inference model according to an execution plan. The execution plan may include instructions for timely inference generation by data processing systems 100 with respect to the inference generation requirements of the downstream consumer. If at least one of data processing systems 100 becomes incapable of meeting the inference generation requirements of the downstream consumer (e.g., due to a delay and/or failure to provide the inferences to the downstream consumer), data processing systems 100 may be dynamically re-assigned in a manner that restores inference generation speed and/or reliability to a level that meets the inference generation requirements of the downstream consumer.

Figure 3A:
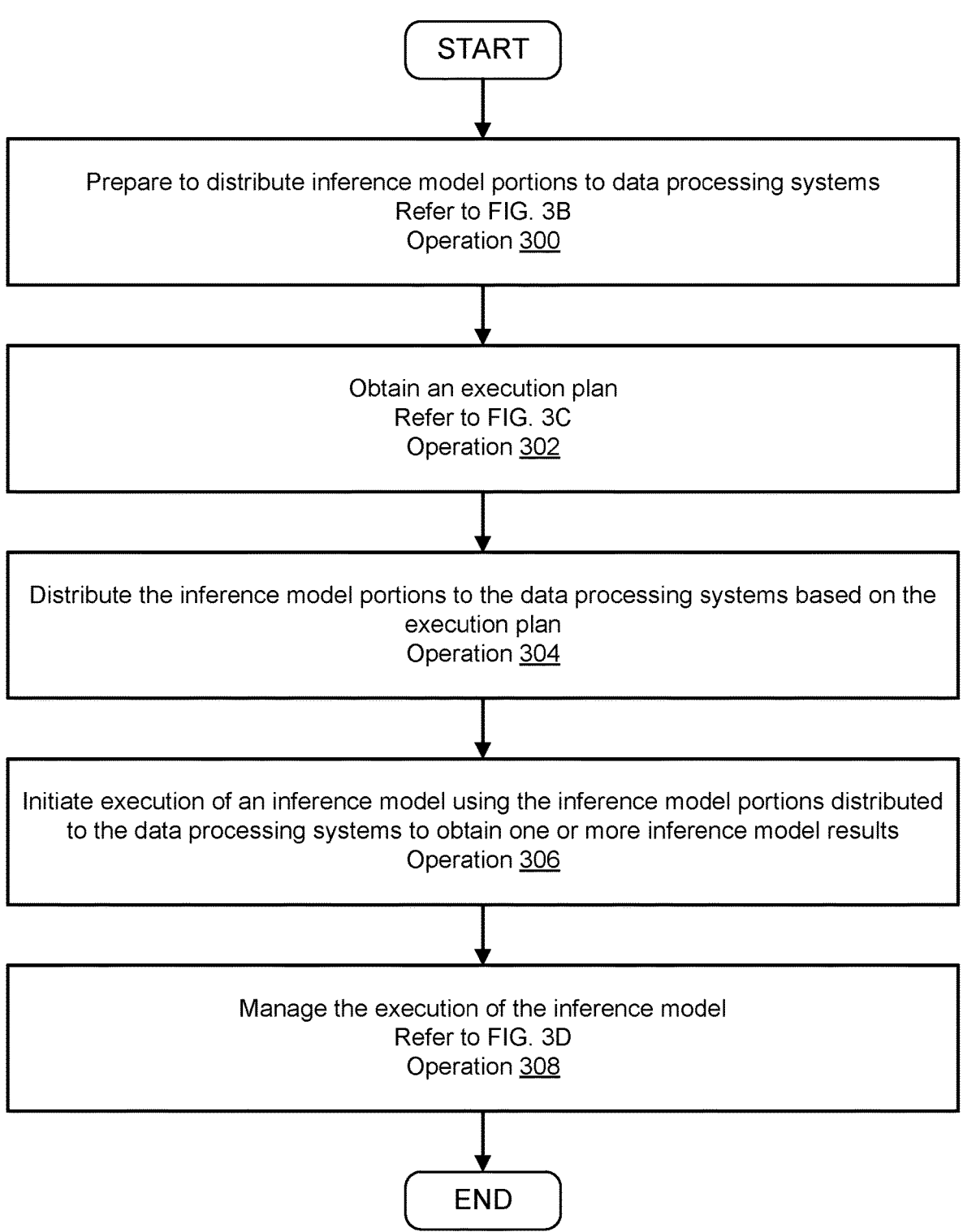
FIG. 3A shows a flow diagram illustrating a method of managing inference models hosted by data processing systems to complete timely execution of the inference models in accordance with an embodiment.
Figure 3B:
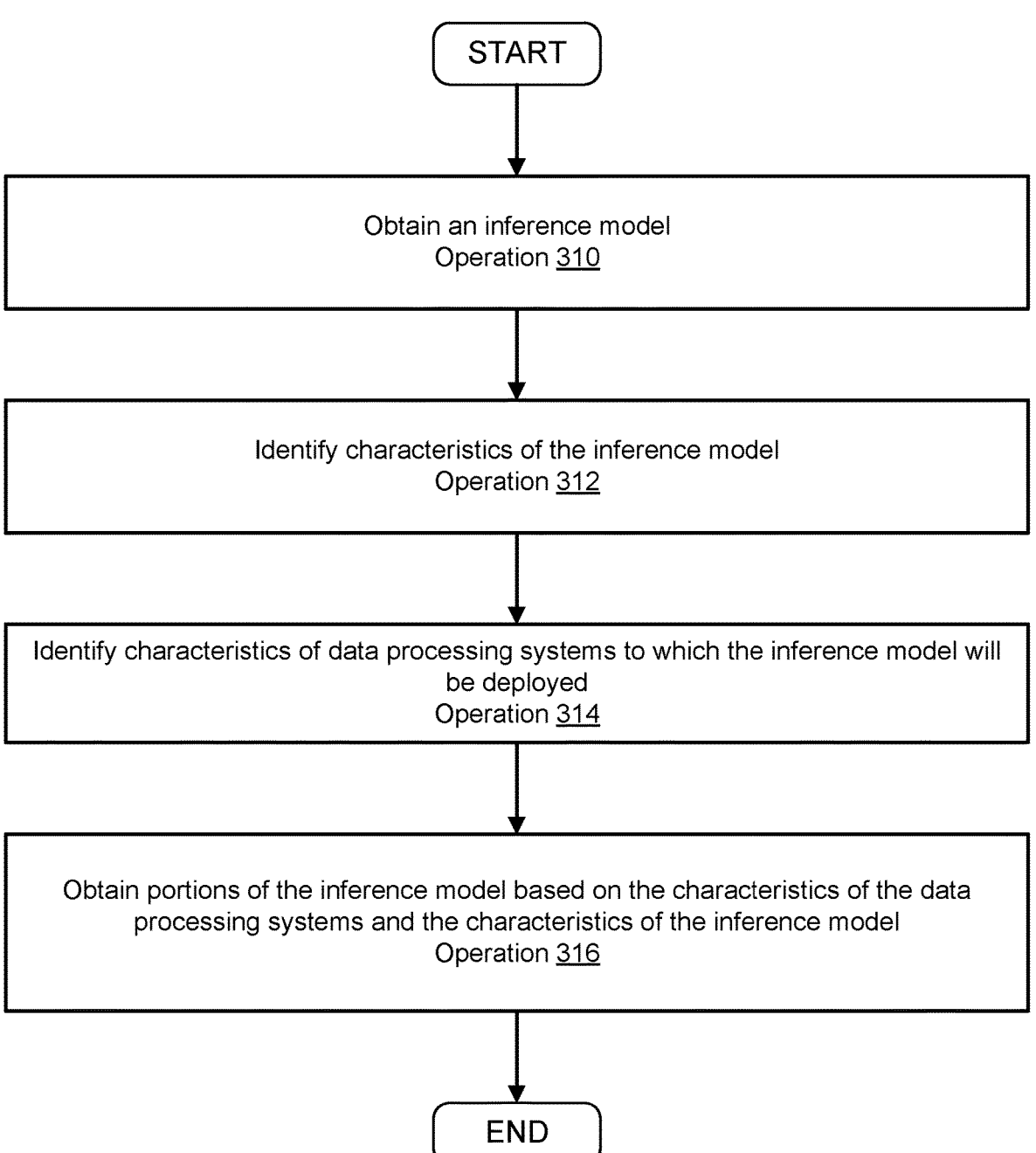
FIG. 3B shows a flow diagram illustrating a method of preparing to distribute inference model portions to data processing systems in accordance with an embodiment.
Figure 3C:
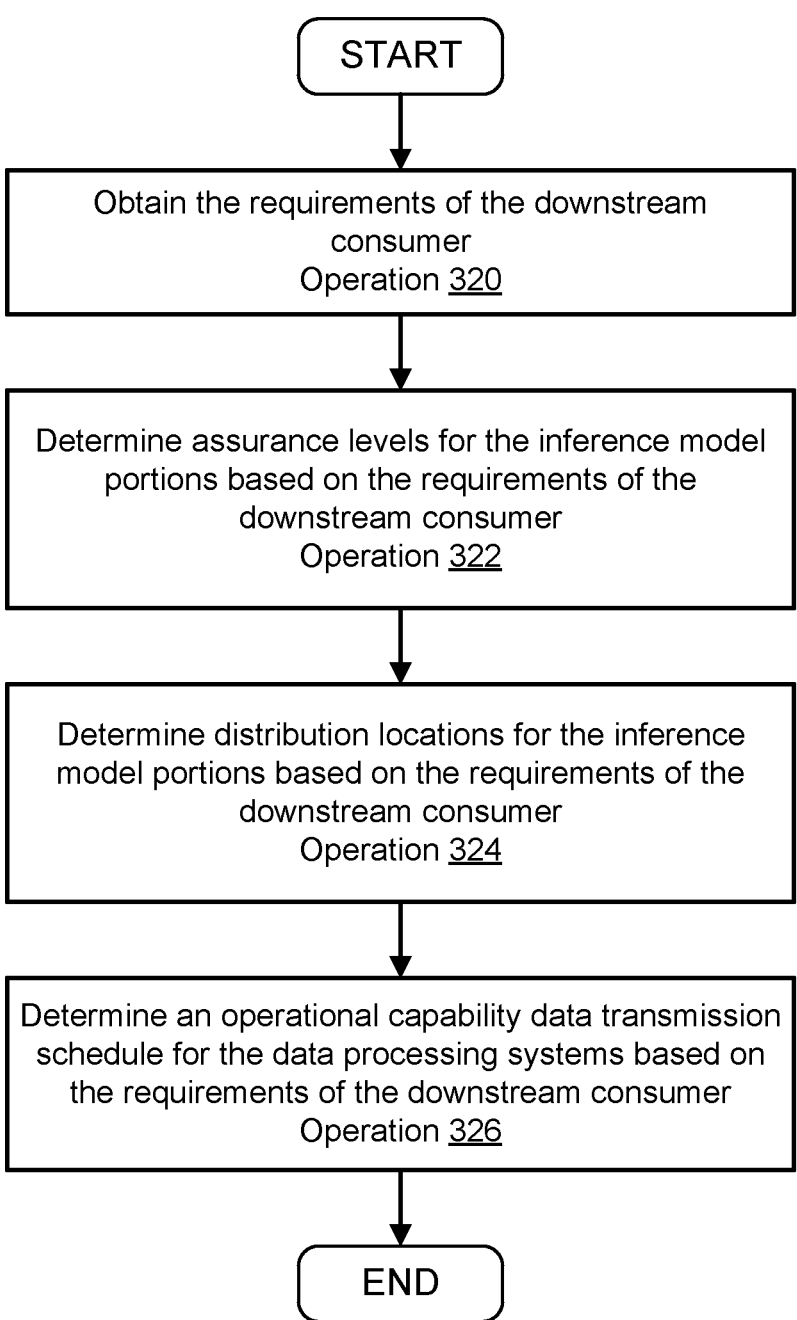
FIG. 3C shows a flow diagram illustrating a method of obtaining an execution plan in accordance with an embodiment.
Figure 3D:
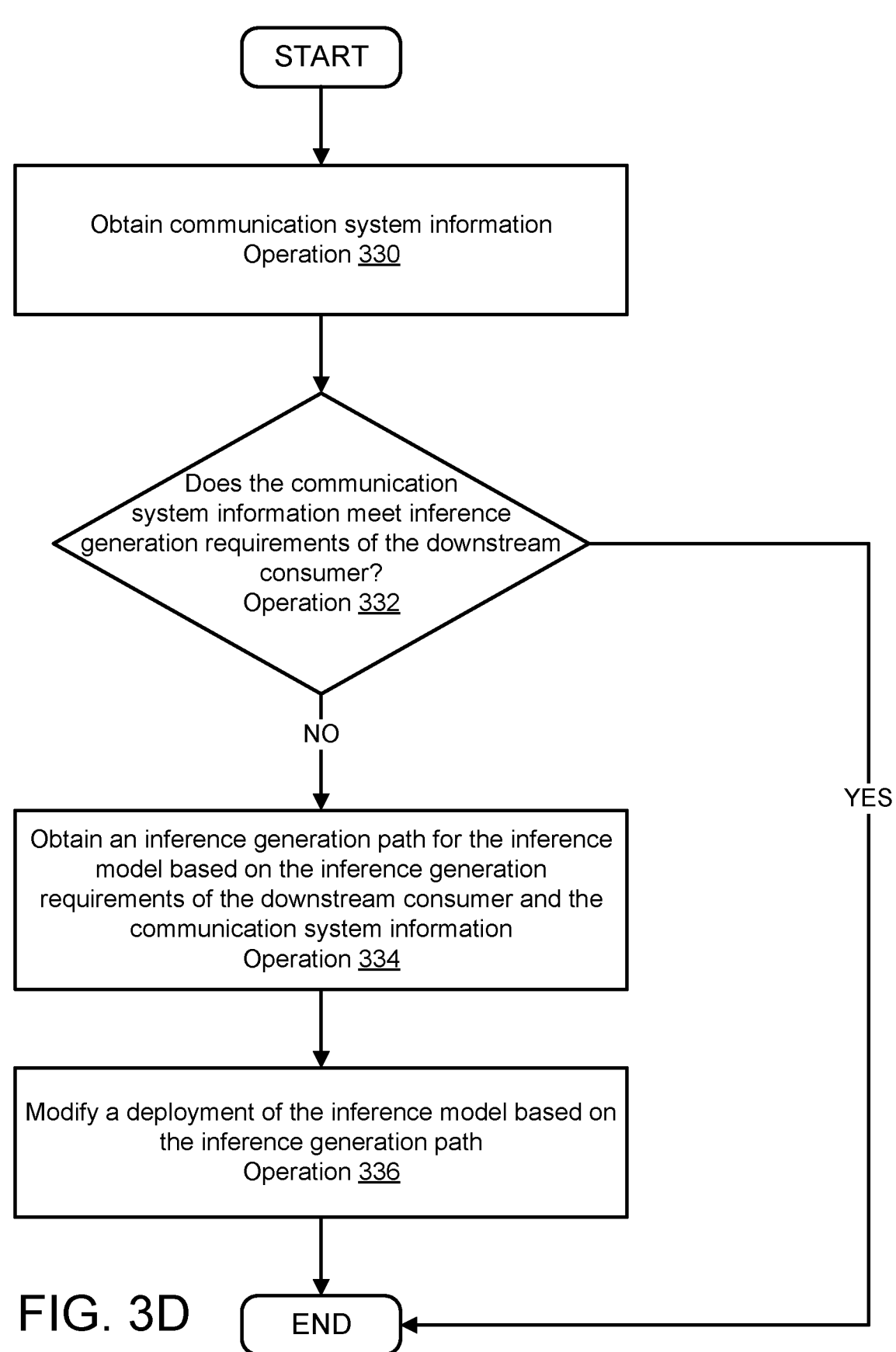
FIG. 3D shows a flow diagram illustrating a method of managing the execution of the inference models in accordance with an embodiment.

To provide its functionality, inference model manager 102 may (i) prepare to distribute inference model portions to data processing systems, and the inference model portions may be based on characteristics of the data processing system and characteristics of the inference model (Refer to FIG. 3B for further discussion), (ii) distribute the inference model portions to the data processing systems, (iii) initiate execution of the inference model using the inference model portions distributed to the data processing systems, and/or (iv) manage the execution of the inference model by monitoring the communication system connecting the data processing systems and dynamically re-assigning the data processing systems to provide continued execution of the inference model based on the inference generation needs of a downstream consumer (Refer to FIG. 3D for further discussion).

When performing its functionality, inference model manager 102 and/or data processing systems 100 may perform all, or a portion, of the methods and/or actions shown in FIGS. 3A-3D.

Data processing systems 100 and/or inference model manager 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data processing systems 100 and/or inference model manager 102 are implemented using an internet of things (IoT) device, which may include a computing device. The IoT device may operate in accordance with a communication model and/or management model known to inference model manager 102, other data processing systems, and/or other devices.

Any of the components illustrated in FIG. 1 may be operably connected to each other (and/or components not illustrated) with communication system 101. In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

In an embodiment, communication system 101 includes multiple point-to-point wireless connections between data processing systems 100. The multiple point-to-point wireless connections may each have distinct properties (e.g., communication bandwidth, reliability of connection, etc.).

While illustrated in FIG. 1 as including a limited number of specific components, a system in accordance with an embodiment may include fewer, additional, and/or different components than those illustrated therein.

Figure 2A:
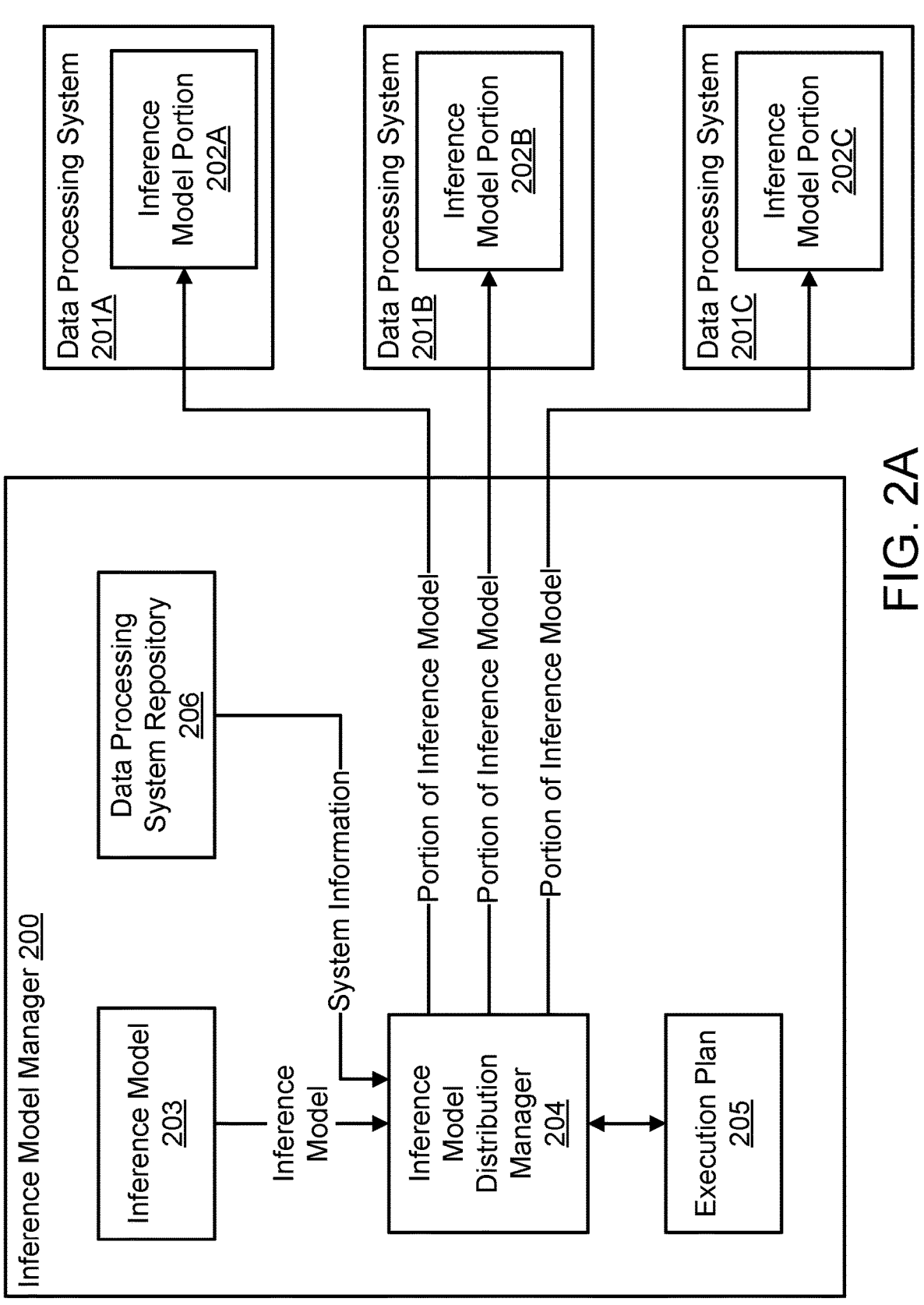
FIG. 2A shows a block diagram illustrating an inference model manager and multiple data processing systems over time in accordance with an embodiment.
Figure 2B:
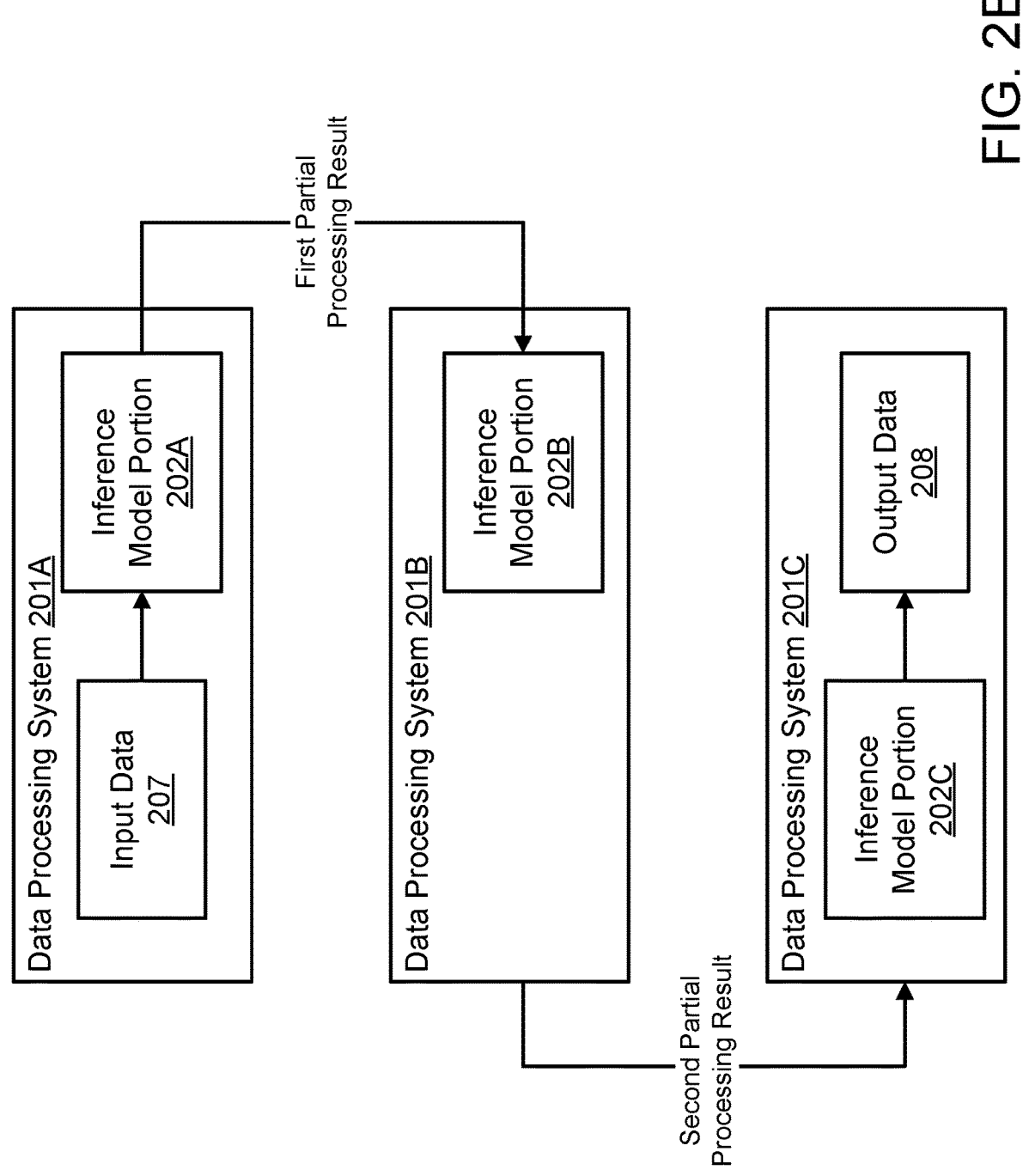
FIG. 2B shows a block diagram illustrating multiple data processing systems over time in accordance with an embodiment.

To further clarify embodiments disclosed herein, diagrams illustrating data flows and/or processes performed in a system in accordance with an embodiment are shown in FIGS. 2A-2B.

FIG. 2A shows a diagram of inference model manager 200 and data processing systems 201A-201C in accordance with an embodiment. Inference model manager 200 may be similar to inference model manager 102, and data processing systems 201A-201C may be similar to any of data processing systems 100. In FIG. 2A, inference model manager 200 and data processing systems 201A-201C are connected to each other via a communication system (not shown). Communications between inference model manager 200 and data processing systems 201A-201C are illustrated using lines terminating in arrows.

As discussed above, inference model manager 200 may perform computer-implemented services by executing an inference model across multiple data processing systems that each individually have insufficient computing resources to complete timely execution of the inference model. The computing resources of the individual data processing systems may be insufficient due to: insufficient available storage to host the inference model and/or insufficient processing capability for timely execution of the inference model.

While described below with reference to a single inference model (e.g., inference model 203), the process may be repeated any number of times with any number of inference models without departing from embodiments disclosed herein.

To execute an inference model across multiple data processing systems, inference model manager 200 may obtain inference model portions and may distribute the inference model portions to data processing systems 201A-201C. The inference model portions may be based on: (i) the computing resource availability of data processing systems 201A-201C and (ii) communication bandwidth availability between the data processing systems. By doing so, inference model manager 200 may distribute the computational overhead and bandwidth consumption associated with hosting and operating the inference model across multiple data processing systems while reducing communications between data processing systems 201A-201C throughout the distributed environment.

To obtain inference model portions, inference model manager 200 may host inference model distribution manager 204. Inference model distribution manager 204 may (i) obtain an inference model, (ii) identify characteristics of data processing systems to which the inference model may be deployed, (iii) obtain inference model portions based on the characteristics of the data processing systems and characteristics of the inference model, (iv) obtain an execution plan based on the inference model portions, the characteristics of the data processing systems, and requirements of a downstream consumer (v) distribute the inference model portions to the data processing systems, (vi) initiate execution of the inference model using the inference model portions distributed to the data processing systems and/or (vii) manage the execution of the inference model based on the execution plan.

Inference model manager 200 may obtain inference model 203. Inference model manager 200 may obtain characteristics of inference model 203. The characteristics of inference model 203 may include, for example, a quantity of layers of a neural network inference model and a quantity of relationships between the layers of the neural network inference model. The characteristics of inference model 203 may also include the quantity of computing resources required to host and operate inference model 203. The characteristics of inference model 203 may include other characteristics based on other types of inference models without departing from embodiments disclosed herein.

Each portion of inference model 203 may be distributed to one data processing system throughout a distributed environment. Therefore, prior to determining the portions of inference model 203, inference model distribution manager 204 may obtain system information from data processing system repository 206. System information may include a quantity of the data processing systems, a quantity of available memory of each data processing system of the data processing systems, a quantity of available storage of each data processing system of the data processing systems, a quantity of available communication bandwidth between each data processing system of the data processing systems and other data processing systems of the data processing systems, and/or a quantity of available processing resources of each data processing system of the data processing systems.

Therefore, inference model distribution manager 204 may obtain a first portion of the inference model (e.g., inference model portion 202A) based on the system information (e.g., the available computing resources) associated with data processing system 201A and based on data dependencies of the inference model so that inference model portion 202A reduces the necessary communications between inference model portion 202A and other portions of the inference model. Inference model distribution manager 204 may repeat the previously described process for inference model portion 202B and inference model portion 202C.

Prior to distributing inference model portions 202A-202C, inference model distribution manager 204 may utilize inference model portions 202A-202C to obtain execution plan 205. Execution plan 205 may include instructions for timely execution of the inference model using the portions of the inference model and based on the needs of a downstream consumer of the inferences generated by the inference model. Refer to FIG. 3B for additional details regarding obtaining an execution plan.

Inference model manager 200 may distribute inference model portion 202A to data processing system 201A, inference model portion 202B to data processing system 201B, and inference model portion 202C to data processing system 201C. While shown in FIG. 2A as distributing three portions of the inference model to three data processing systems, the inference model may be partitioned into any number of portions and distributed to any number of data processing systems throughout a distributed environment. Further, while not shown in FIG. 2A, redundant copies of the inference model portions may also be distributed to any number of data processing systems in accordance with an execution plan.

Inference model manager 102 may initiate execution of the inference model using the portions of the inference model distributed to the data processing systems to obtain an inference model result (e.g., one or more inferences). The inference model result may be usable by a downstream consumer to perform a task, make a control decision, and/or perform any other action set (or action).

Inference model manager 102 may manage the execution of the inference model based on the execution plan. Managing execution of the inference model may include monitoring changes to a listing of data processing systems over time and/or revising the execution plan as needed to obtain the inference model result in a timely manner and/or in compliance with the needs of a downstream consumer. An updated execution plan may include re-assignment of data processing systems to new portions of the inference model, re-location of data processing systems to meet the needs of the downstream consumer, determining new inference generation paths to optimize efficiency of inference generation throughout the distributed environment, and/or other instructions. When providing its functionality, inference model manager 102 may use and/or manage agents across any number of data processing systems. These agents may collectively provide all, or a portion, of the functionality of inference model manager 102. As previously mentioned, the process shown in FIG. 2A may be repeated to distribute portions of any number of inference models to any number of data processing systems.

Turning to FIG. 2B, data processing systems 201A-201C may execute the inference model. To do so, data processing system 201A may obtain input data 207. Input data 207 may include any data of interest to a downstream consumer of the inferences. For example, input data 207 may include data indicating the operability and/or specifications of a product on an assembly line.

Input data 207 may be fed into inference model portion 202A to obtain a first partial processing result. The first partial processing result may include values and/or parameters associated with a portion of the inference model. The first partial processing result may be transmitted (e.g., via a wireless communication system) to data processing system 201B. Data processing system 201B may feed the first partial processing result into inference model portion 202B to obtain a second partial processing result. The second partial processing result may include values and/or parameters associated with a second portion of the inference model. The second partial processing result may be transmitted to data processing system 201C. Data processing system 201C may feed the second partial processing result into inference model portion 202C to obtain output data 208. Output data 208 may include inferences collectively generated by the portions of the inference model distributed across data processing systems 201A-201C.

Output data 208 may be utilized by a downstream consumer of the data to perform a task, make a decision, and/or perform any other action set that may rely on the inferences generated by the inference model. For example, output data 208 may include a quality control determination regarding a product manufactured in an industrial environment. Output data 208 may indicate whether the product meets the quality control standards and should be retained or does not meet the quality control standards and should be discarded. In this example, output data 208 may be used by a robotic arm to decide whether to place the product in a "retain" area or a "discard" area.

While shown in FIG. 2B as including three data processing systems, a system may include any number of data processing systems to collectively execute the inference model. Additionally, as noted above, redundant copies of the inference model hosted by multiple data processing systems may each be maintained so that termination of any portion of the inference model may not impair the continued operation of the inference model. In addition, while described in FIG. 2B as including one inference model, the system may include multiple inference models distributed across multiple data processing systems.

While described above as feeding input data 207 into data processing system 201A and obtaining output data 208 via data processing system 201C, other data processing systems may utilize input data and/or obtain output data without departing from embodiments disclosed herein. For example, data processing system 201B and/or data processing system 201C may obtain input data (not shown). In another example, data processing system 201A and/or data processing system 201B may generate output data (not shown). A downstream consumer may be configured to utilize output data obtained from data processing system 201A and/or data processing system 201B to perform a task, make a decision, and/or perform an action set.

Each of data processing systems 201A-201C may transmit operational capability data to inference model manager 102 (not shown) at variable time intervals as designated by an execution plan. Data processing systems 201A-201C may transmit the operational capability data to maintain membership in a listing of functional data processing systems throughout the distributed environment, to report their current computing resource capacity, and/or for other reasons. In the event that one of data processing systems 201A-201C may not transmit the operational capability data at the designated time, inference model manager 102 may obtain an updated execution plan, may re-assign the inference model portions hosted by the data processing systems, and/or may establish a new inference generation path (described with more detail with respect to FIG. 3D).

By executing an inference model across multiple data processing systems, computing resource expenditure throughout the distributed environment may be reduced. In addition, by managing execution of the inference model, the functionality and/or connectivity of the data processing systems may be adapted over time to remain in compliance with the needs of a downstream consumer.

In an embodiment, inference model distribution manager 204 is implemented using a processor adapted to execute computing code stored on a persistent storage that when executed by the processor performs the functionality of inference model distribution manager 204 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to execute inference models throughout a distributed environment. FIGS. 3A-3D illustrate methods that may be performed by the components of FIG. 1. In the diagrams discussed below and shown in FIGS. 3A-3D, any of the operations may be repeated, performed in different orders, and/or performed in parallel with or in a partially overlapping in time manner with other operations.

Turning to FIG. 3A, a flow diagram illustrating a method of managing inference models hosted by data processing systems to complete timely execution of the inference models in accordance with an embodiment is shown.

At operation 300, the inference model manager prepares to distribute inference model portions to data processing systems. To prepare to distribute inference model portions, the inference model manager may obtain one or more inference models, may identify characteristics of the inference models (e.g., computing resource requirements, or the like), may identify characteristics of the data processing systems, and may obtain portions of each inference model based on the characteristics of the inference models and the characteristics of the data processing systems. Refer to FIG. 3B for additional details regarding this preparation step.

At operation 302, the inference model manager obtains an execution plan. The execution plan may be based on the inference model portions, the characteristics of the data processing systems, and requirements of a downstream consumer. The execution plan may include: (i) instructions for obtaining portions of the inference models, (ii) instructions for distribution of the inference models, (iii) instructions for execution of the inference models, and/or other instructions. The execution plan may be obtained to facilitate timely execution of the inference models in accordance with the needs of a downstream consumer of the inferences generated by the inference model. The execution plan may be generated by inference model manager 102 and/or obtained from another entity throughout the distributed environment. Refer to FIG. 3C for additional details regarding obtaining an execution plan.

At operation 304, the inference model portions are distributed to the data processing systems based on the execution plan. The inference model portions may be distributed to data processing systems in a manner that reduces communications between data processing systems during execution of the inference model and utilizes the available computing resources of each data processing system. One inference model portion of the inference model portions may be distributed to each data processing system of the data processing systems. The inference model portions may be distributed by sending copies of the inference model portions to corresponding data processing systems (e.g., via one or more messages), by providing the data processing systems with information that allows the data processing system to retrieve the inference model portions, and/or via other methods.

At operation 306, execution of an inference model is initiated using the inference model portions distributed to the data processing systems to obtain one or more inference model results. The inference model may be executed in accordance with the execution plan. Inference model manager 102 may execute the inference model by sending instructions and/or commands to data processing systems 100 to initiate execution of the inference model, the inference model may automatically begin executing once deployed, and/or via other methods.

In an embodiment, the inference model ingests input data while executing. The input data may be obtained by inference model manager 102, any of data processing systems 100, and/or another entity. Inference model manager 102 may obtain the input data and/or transmit the input data to a first data processing system of data processing systems 100 along with instructions for timely execution of the inference model based on the input data. The instructions for timely execution of the inference model may be based on the needs of a downstream consumer with respect to the inferences generated by the inference model. The inference model may ingest the input data during execution and may provide an output (e.g., an inference) based on the ingest.

At operation 308, the execution of the inference model is managed by inference model manager 102. Execution of the inference model may be managed by obtaining communication system information. Inference model manager 102 may determine whether the communication system information meets inference generation requirements of the downstream consumer. If the communication system information does not meet the inference generation requirements of the downstream consumer, inference model manager 102 may: (i) obtain an inference generation path for the inference model based on the inference generation requirements of the downstream consumer and the communication system information, and (ii) modify a deployment of the inference model based on the inference generation path. Refer to FIG. 3D for additional details regarding managing the execution of the inference models.

Managing the execution of the inference models may be performed by inference model manager 102 and/or data processing systems 100. In a first example, the system may utilize a centralized approach to managing the execution of the inference model. In the centralized approach, an off-site entity (e.g., a data processing system hosting inference model manager 102) may make decisions and perform the operations detailed in FIG. 3D. In a second example, the system may utilize a de-centralized approach to managing the execution of the inference model. In the de-centralized approach, data processing systems 100 may collectively make decisions and perform the operations detailed in FIG. 3D. In a third example, the system may utilize a hybrid approach to managing the execution of the inference model. In the hybrid approach, and offsite entity may make high-level decisions (e.g., whether the data processing systems are in compliance with the needs of the downstream consumer) and may delegate implementation-related decisions (e.g., how to modify the execution plan and implement the updated execution plan) to data processing systems 100. The inference model may be managed via other methods without departing from embodiments disclosed herein.

The method may end following operation 308.

Turning to FIG. 3B, a method of preparing to distribute inference model portions to data processing systems in accordance with an embodiment is shown. The operations shown in FIG. 3B may be an expansion of operation 300 in FIG. 3A.

At operation 310, an inference model is obtained. The inference model may be implemented with, for example, a neural network inference model. The inference model may generate inferences that may be usable to downstream consumers.

In an embodiment, the inference model is obtained by inference model manager 102 using a training data set. The training data set may be fed into the neural network inference model (and/or any other type of inference generation model) as part of a training process to obtain the inference model. The inference model may also be obtained from another entity through a communication system. For example, the inference model may be obtained by another entity through training a neural network inference model and providing the trained neural network inference model to inference model manager 102.

At operation 312, characteristics of the inference model are identified. The characteristics of the inference model may include a computing resource requirement for the inference model, topology of the inference model, and/or other characteristics. The computing resource requirement may indicate a quantity of computing resources (e.g., storage, memory, processing resources, or the like) required to host and operate the inference model. The characteristics of the inference model may include other characteristics based on other types of inference models without departing from embodiments disclosed herein. The topology of the inference model may indicate, for example, a quantity of layers of a neural network inference model and a quantity of relationships between the layers of the neural network inference model.

In an embodiment, characteristics of the inference model are identified by obtaining the characteristics of the inference model from a downstream consumer. For example, the downstream consumer may transmit at least a portion of the characteristics of the inference model to inference model manager 102 via one or more messages. The characteristics of the inference model may be obtained by another entity (e.g., a data aggregator) and provided to inference model manager 102. Inference model manager 102 may also be provided with instructions for retrieval of the characteristics of the inference model from an inference model characteristic repository hosted by another entity throughout the distributed environment.

In an embodiment, inference model manager 102 identifies the characteristics of the inference model by performing an analysis of the inference model trained by inference model manager 102. The characteristics of the inference model may be identified from other sources and/or via other methods without departing from embodiments disclosed herein.

As previously mentioned, the inference model may have a corresponding computing resource requirement. The computing resource requirement may indicate the quantity of computing resources (e.g., storage, memory, processing resources, etc.) required to host and operate the inference model.

At operation 314, characteristics of data processing systems to which the inference model will be deployed are identified. The characteristics of the data processing systems may include a quantity of the data processing systems, a quantity of available storage of each data processing system of the data processing systems, a quantity of available memory of each data processing system of the data processing systems, a quantity of available communication bandwidth between each data processing system of the data processing system and other data processing systems of the data processing systems, and/or a quantity of available processing resources of each data processing system of the data processing systems.

In an embodiment, the characteristics of the data processing systems are provided to inference model manager 102 by data processing systems 100, and/or by any other entity throughout the distributed environment. The characteristics of the data processing systems may be transmitted to inference model manager 102 according to instructions specified by the execution plan. As an example, the execution plan may instruct the data processing systems to transmit characteristics of the data processing systems at regular intervals (e.g., once per hour, once per day, etc.).

The characteristics of the data processing systems may be transmitted by data processing systems 100 to inference model manager 102 upon request by inference model manager 102. Inference model manager 102 may request a transmission from data processing systems 100 and/or from another entity (e.g., a data aggregator) responsible for aggregating data related to the characteristics of the data processing systems. The characteristics of the data processing systems may be utilized by inference model manager 102 to obtain portions of the inference model as described below.

At operation 316, portions of the inference model are obtained based on the characteristics of the data processing systems and the characteristics of the inference model. To obtain the portions of the inference model, inference model manager 102 may, for example, represent a neural network inference model as a bipartite graph. The bipartite graph may indicate data dependencies between nodes in the neural network inference model. Refer to FIG. 2A for additional details regarding obtaining portions of an inference model.

In an embodiment, portions of the inference model are obtained by another entity in the distributed environment and via any method. The other entity may transmit the portions of the inference model (and/or instructions for obtaining the portions of the inference model) to inference model manager 102.

The method may end following operation 316.

Turning to FIG. 3C, a method of obtaining an execution plan in accordance with an embodiment is shown. The operations shown in FIG. 3C may be an expansion of operation 302 in FIG. 3A.

At operation 320, requirements of the downstream consumer are obtained. The requirements of the downstream consumer may include assurance levels for each portion of the inference model, execution locations for each portion of the inference model, an operational capability data transmission schedule for the data processing systems, and/or other requirements.

In an embodiment, requirements of the downstream consumer are obtained by inference model manager 102 directly from the downstream consumer prior to initial deployment of the inference model, at regular intervals, and/or in response to an event instigating a change in the requirements of the downstream consumer.

In an embodiment, another entity (e.g., a downstream consumer data aggregator) aggregates data related to the requirements of one or more downstream consumers throughout a distributed environment and transmits this information to inference model manager 102 as needed.

At operation 322, assurance levels are determined for each inference model portion based on the requirements of the downstream consumer. Assurance levels may indicate a quantity of instances of a corresponding inference model portion that are to be hosted by the data processing systems. For example, the inference model may be partitioned into a first portion and a second portion. The assurance level for the inference model may specify that two instances of the first portion and three instances of the second portion must be operational to comply with the requirements of the downstream consumer.

In an embodiment, the assurance levels are based on inference model redundancy requirements indicated by the downstream consumer at any time and/or are included in the requirements of the downstream consumer obtained in operation 320. The assurance levels may be transmitted to inference model manager 102 directly from the downstream consumer, may be obtained from another entity responsible for determining assurance levels based on the requirements of the downstream consumer, and/or from other sources. In an embodiment, inference model redundancy requirements of the downstream consumer are transmitted from the downstream consumer to inference model manager 102 and inference model manager 102 may determine the assurance levels based on the inference model redundancy requirements.

At operation 324, distribution locations are determined for the inference model portions based on the requirements of the downstream consumer. Distribution locations (e.g., execution locations) may be selected to reduce geographic clustering of redundant instances of the inference model portions. In an embodiment, the distribution locations are included in the requirements of the downstream consumer obtained in operation 320. In an embodiment, inference model manager 102 (and/or another entity) obtains the requirements of the downstream consumer and may determine the distribution locations based on the requirements of the downstream consumer.

At operation 326, an operational capability data transmission schedule is determined for the data processing systems based on the requirements of the downstream consumer. The operational capability data transmission schedule may instruct data processing systems to transmit operational capability data to inference model manager 102 at various time intervals. Operational capability data may include: (i) the portion of the inference model hosted by each data processing system and (ii) a current computing resource capacity of each data processing system.

For example, the operation of a downstream consumer may be highly sensitive to variations in transmissions of the inferences generated by the inference model (e.g., latencies in receiving inferences due to communication pathway bottlenecks). Therefore, the downstream consumer may require frequent updates to the deployment of the inference model. To do so, inference model manager 102 may determine an operational capability data transmission schedule of five transmissions per hour. In another example, the operation of a second downstream consumer may not be highly sensitive to variations in transmissions of the inferences generated by the inference model (e.g., latencies in receiving inferences due to communication pathway bottlenecks). Therefore, the downstream consumer may not require frequent updates to the deployment of the inference model and inference model manager 102 may determine an operational capability data transmission schedule of one transmission per day.

In an embodiment, the operational capability data transmission schedule is determined by inference model manager 102 based on the requirements of the downstream consumer. To do so, the downstream consumer (and/or another entity throughout the distributed environment) may transmit operational capability data transmission frequency requirements to inference model manager 102. Inference model manager 102 may then determine the operational data transmission schedule based on the operational capability data transmission frequency requirements. In an embodiment, the operational capability data transmission schedule is determined by the downstream consumer (and/or other entity) and instructions to implement the operational capability data transmission schedule may be transmitted to inference model manager 102.

The method may end following operation 326.

Turning to FIG. 3D, a method of managing the execution of the inference models in accordance with an embodiment is shown. The operations shown in FIG. 3D may be an expansion of operation 308 in FIG. 3A.

At operation 330, communication system information is obtained. The communication system may include multiple point-to-point wireless connections between data processing systems 100, and each point-to-point wireless connection of the multiple point-to-point wireless connections may have distinct characteristics. For example, a first point-to-point wireless connection between two data processing systems of data processing systems 100 may have a higher communication bandwidth capability than a second point-to-point wireless connection between two data processing systems of data processing systems 100.

Communication system information may include: (i) a quantity of available communication system bandwidth between each data processing system of the data processing systems; and (ii) a reliability of transmission between each data processing system of the data processing systems. The reliability of transmission between each data processing system of the data processing systems may be based on: (i) historical data indicating the likelihood of successful transmission of data between each data processing system of the data processing systems, or (ii) a distance between each data processing system of the data processing systems.

In an embodiment, inference model manager 102 obtains the communication system information from each data processing system of data processing systems 100. In an embodiment, another entity (e.g., a data processing system manager) collects the communication system information from data processing systems 100 and provides the communication system information to inference model manager 102. The communication system information may be obtained at regular intervals (e.g., once per hour) and/or as needed by inference model manager 102. The schedule for transmission of communication system information may be dictated by the execution plan.

At operation 332, it is determined whether the communication system information meets inference generation requirements of the downstream consumer. The inference generation requirements of the downstream consumer may be based on: (i) an inference generation speed threshold and (ii) an inference generation reliability threshold. The inference generation speed threshold may indicate a minimum quantity of communication bandwidth between each data processing system of the data processing systems to meet the inference generation requirements of the downstream consumer. The inference generation reliability threshold may indicate a minimum likelihood of successful transmission of data between each data processing system of the data processing systems to meet the inference generation requirements of the downstream consumer.

Inference model manager 102 may obtain the inference generation requirements of the downstream consumer information from any number of downstream consumers. The inference generation may be obtained at regular intervals (e.g., once per day) and/or as needed to respond to changes in the needs of the downstream consumer. In an embodiment, another entity (e.g., a downstream consumer manager) aggregates downstream consumer information from one or more downstream consumers and transmit the data to inference model manager 102. The inference generation requirements of the downstream consumer may be obtained as part of the requirements of the downstream consumer obtained in operation 320 (Refer to FIG. 3C).

For example, the inference generation requirements of the downstream consumer may include: (i) a inference generation speed threshold of 100 megabits per second (Mbps) and (ii) and an inference generation reliability threshold of 75% likelihood of successful completion of execution of the inference model. The communication system information may indicate that the communication system has a bandwidth of 90 Mbps between two data processing systems of data processing systems 100. Therefore, the communication system may not meet the inference generation requirements of the downstream consumer.

The determination may be made by comparing the communication system information to the inference generation requirements. For example, the inference generation requirement may specify any number of standards to which the communication system information may be compared. The communication system information may need to meet all, or a portion, of the standards for it to be determined that the communication system information meets the inference generation requirements.

If the communication system information meets the inference generation requirements of the downstream consumer (e.g., meets all of the standards), then the method may end following operation 332. If the communication system information does not meet the inference generation requirements of the downstream consumer, then the method may proceed to operation 334.

At operation 334, an inference generation path is obtained for the inference model based on the inference generation requirements of the downstream consumer and the communication system information. The inference generation path may include: a listing of instances of each of the portions of the inference model (and the data processing systems hosting the portions) usable to generate an inference model result in compliance with the inference generation requirements of the downstream consumer; and an ordering of the listing of the instances.

The inference generation path may be obtained by representing the data processing systems as a directed acyclic graph. The directed acyclic graph may display a selection of data processing systems 100 usable to generate inferences in a manner that complies with the inference generation requirements of the downstream consumer. The directed acyclic graph may include a series of elements (the data processing systems), lines connecting the elements (representing communication system connections and directions of transmissions between the data processing systems), and an ordering of the data processing systems. The ordering of the data processing systems may be based on the portion of the inference model hosted by each of the data processing systems (e.g., a data processing system hosting input nodes of a neural network may be first in the ordering). One of the paths may be selected as the inference generation path (e.g., the paths may be analyzed to identify which best meets or at least meets the inference generation requirements).

The inference generation path may be obtained by inference model manager 102, data processing systems 100, and/or any other entity throughout the distributed environment. Inference model manager 102 may obtain the inference generation path by, for example, obtaining communication network bandwidth measurements for each point-to-point wireless connection between the data processing systems. Inference model manager 102 may identify one or more inference generation paths between the data processing systems so that the communication bandwidth does not fall below the inference generation speed threshold. In addition, inference model manager 102 may determine which of the one or more inference generation paths has a likelihood of successful completion of execution of the inference models of at least 75%.

In an embodiment, the inference generation path is obtained by another entity (e.g., an inference generation path manager), and the inference generation path manager may transmit the inference generation path to inference model manager 102. Inference model generation paths may be obtained via other methods without departing from embodiments disclosed herein.

At operation 336, a deployment of the inference model is modified based on the inference generation path. To modify the deployment of the inference model, inference model manager 102 (and/or any other entity) may deploy instructions implementing the inference generation path (e.g., deploying portions of an inference model to certain data processing systems, and programming the data processing systems to cooperate in the execution of the inference model) to data processing systems 100. The instructions may be obtained by another entity and transmitted to inference model manager 102 for eventual distribution to data processing systems 100.

The instructions may include the listing of the data processing systems, and the ordering of the data processing systems. The ordering may indicate which portions of the inference model are to be executed prior to and/or subsequently to other portions, and/or may indicate which portions of data generated by the execution of the portions of the inference model (e.g., hidden layer values) are to be distributed to other data processing systems. By doing so, inference generation may proceed via an updated sequence of instances of the portions of the inference model. The updated sequence of instances of the portions of the inference model may support inference generation with a speed and a reliability to meet the inference generation requirements of the downstream consumer.

The method may end following operation 336.

Using the method illustrated in FIG. 3D, embodiments disclosed herein may improve the reliability of distributed computations performed by data processing systems. For example, the method may facilitate redeployment of distributed inference models so that the execution of the inference models is aligned with downstream consumer expectations.

Figure 4A:
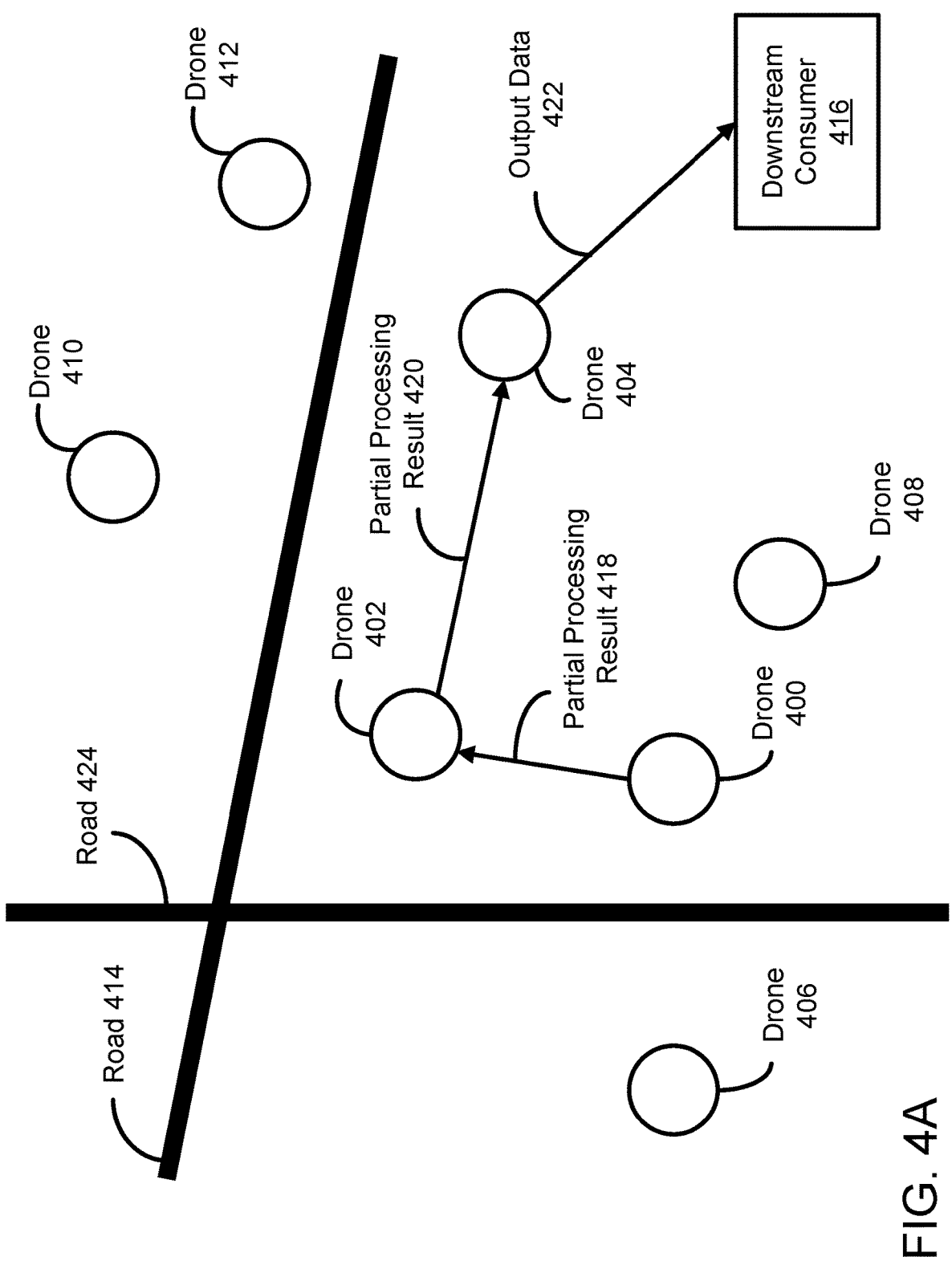
FIGS. 4A-4C show diagrams illustrating a method of executing inference models across multiple data processing systems over time in accordance with an embodiment.
Figure 4B:
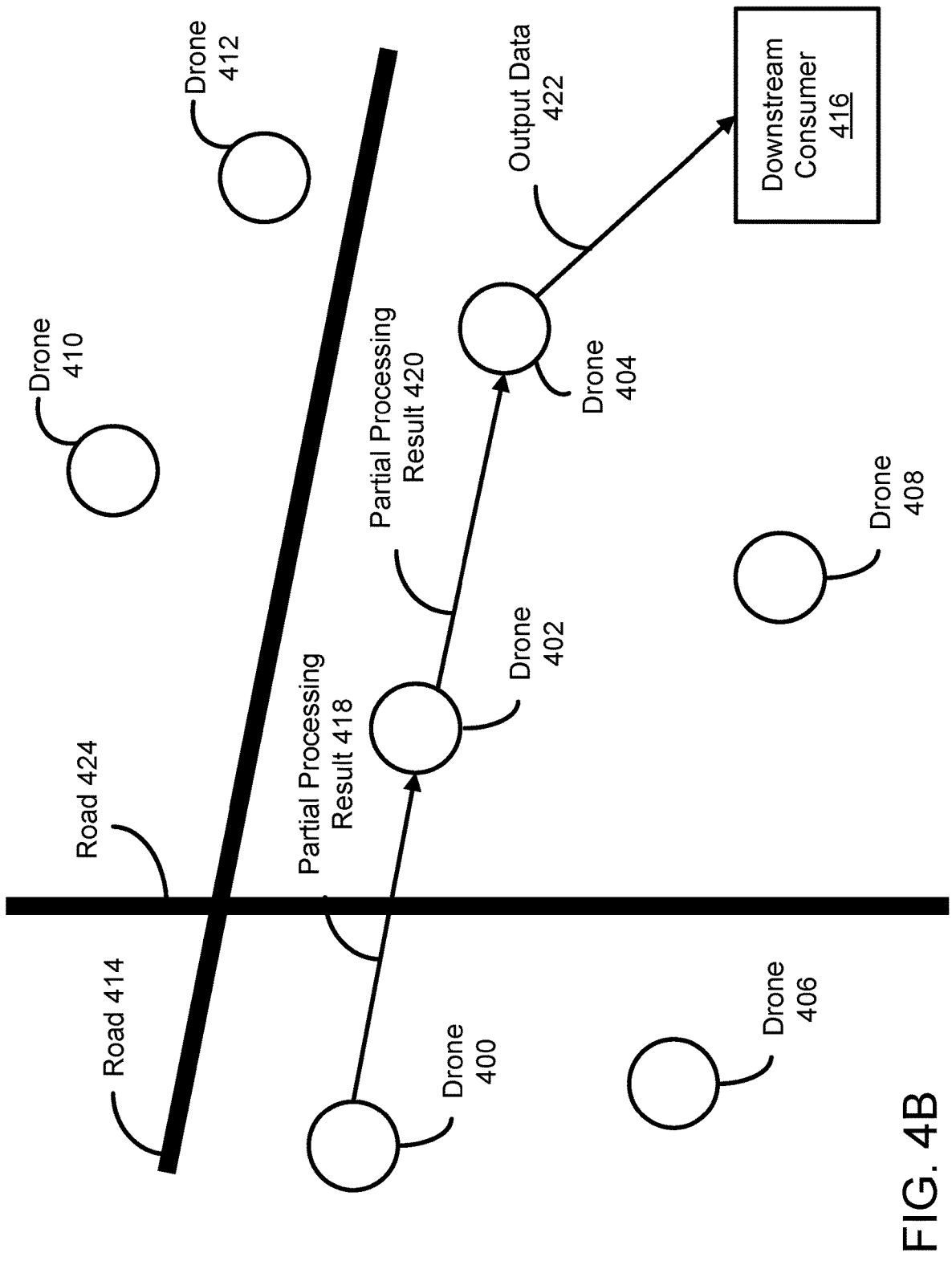
Figure 4C:
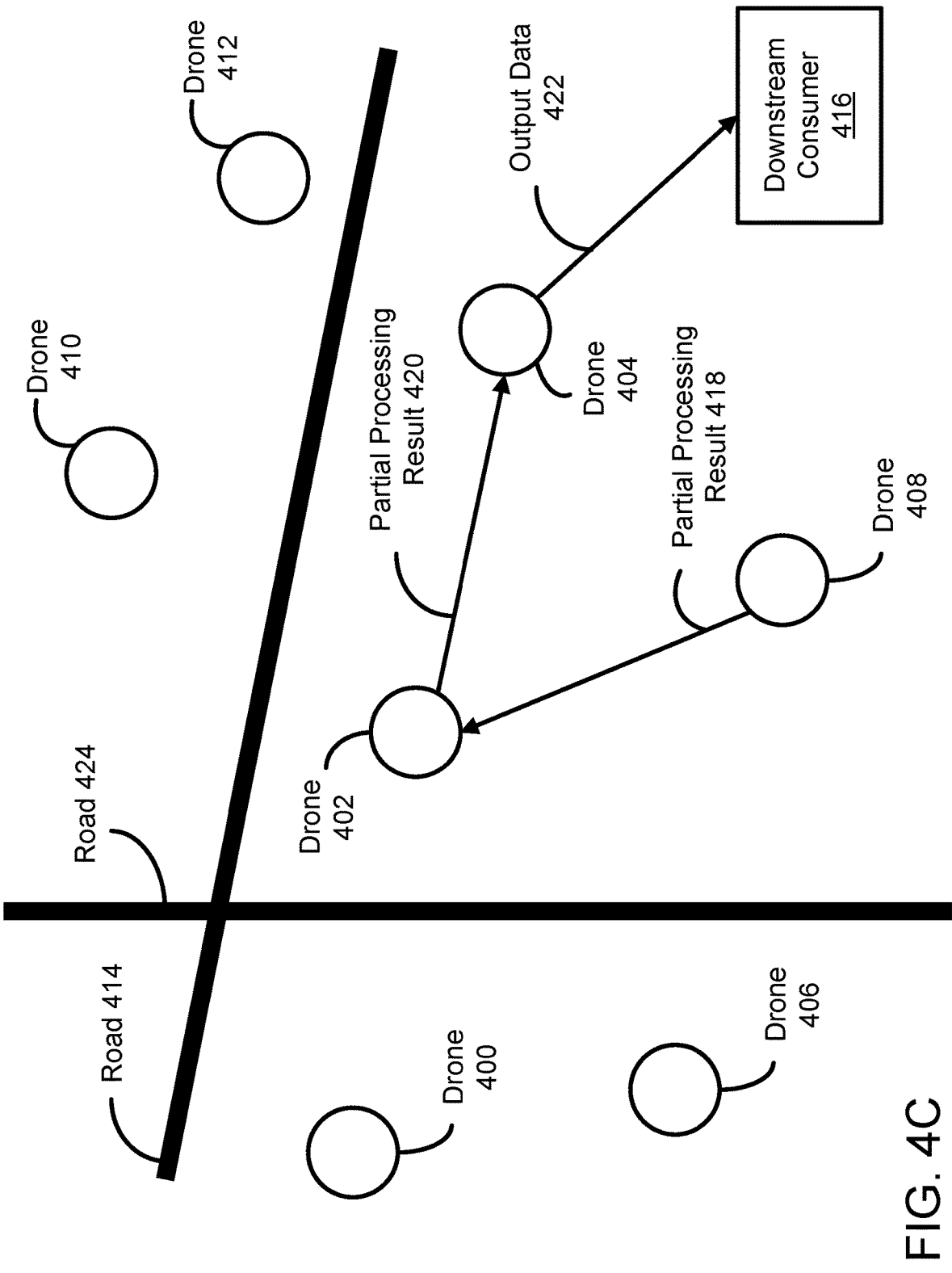

To further clarify embodiments disclosed herein, an example implementation in accordance with an embodiment is shown in FIGS. 4A-4C. These figures show diagrams illustrating an inference model execution and management process in accordance with an embodiment.

Turning to FIG. 4A, consider a scenario in which drones 400-412 are positioned surrounding an intersection of road 414 and road 424. Drones 400-412 may host and operate portions of an inference model trained to predict weather patterns in the area surrounding the intersection of road 414 and road 424. The inference model may be segmented into three portions and a copy of a portion of the inference model may be deployed to each drone of drones 400-412 (including redundant copies).

For example, drone 400 may host a copy of a first portion of the inference model, drone 402 may host a copy of a second portion of the inference model, drone 404 may host a copy of a third portion of the inference model, drone 406 may host a copy of the second portion of the inference model, drone 408 may host a copy of the first portion of the inference model, drone 410 may host a copy of the third portion of the inference model, and drone 412 may host a copy of the second portion of the inference model.

An inference model manager (not shown) may determine an inference generation path for the inference model based on inference generation requirements of downstream consumer 416. The inference generation requirements of downstream consumer 416 may include: (i) a communication system bandwidth of each segment of the inference generation path of at least 120 Mbps and (ii) a reliability of inference generation (e.g., a likelihood of successful completion of execution of the inference model by drones 400-404) of at least 80%.

The inference generation path may include three drones of drones 400-412 responsible for generating the inferences. First, drone 400 may obtain input data (not shown) from an ambient environment surrounding road 414. Second, drone 400 may feed the input data into the copy of the first portion of the inference model hosted by drone 400 to obtain partial processing result 418 and may transmit partial processing result 418 to drone 402. Third, drone 402 may feed partial processing result 418 into the copy of the second portion of the inference model hosted by drone 402 to obtain partial processing result 420 and may transmit partial processing result 420 to drone 404. Fourth, drone 404 may feed partial processing result 420 into the copy of the third portion of the inference model hosted by drone 404 to obtain output data 422 and may transmit output data 422 to downstream consumer 416. While other inference generation paths may be generated using the copies of the portions of the inference model deployed to drones 400-414, other inference generation paths may not meet one or more of the inference generation paths of downstream consumer 416.

Turning to FIG. 4B, drone 400 may move to a new location (e.g., due to being given instructions to predict likely future weather conditions in the new location). The new location may be on the left side of road 424 (as shown in FIG. 4B). Trucks may regularly utilize road 424 and, therefore, the connection between drone 400 and drone 402 may be frequently disrupted by the passing trucks. Therefore, the reliability of inference generation for drone 400 may fall to 50% and the inference generation path may no longer meet the inference generation requirements of downstream consumer 416.

Turning to FIG. 4C, the inference model manager (not shown) may determine that the inference generation path no longer meets the inference generation requirements of the downstream consumer (e.g., via obtaining communication system information for the inference generation path). The inference model manager may identify an updated inference generation path using drones 400-414 to restore the reliability of inference generation to at least 80%.

As previously mentioned, drone 408 may also host a copy of the first portion of the inference model. The updated inference generation path (shown in FIG. 4C) may include drone 408 obtaining the input data (not shown), generating partial processing result 418, and transmitting partial processing result 418 to drone 402. The remainder of the updated inference model path may follow the same steps as the inference generation path (e.g., drone 402 may generate partial processing result 420 and may transmit partial processing result 420 to drone 404, and drone 404 may generate output data 422 and may transmit output data 422 to downstream consumer 416).

Thus, as illustrated in FIGS. 4A-4C, embodiments disclosed herein may provide for a distributed environment capable of providing services despite changes to a speed and/or a reliability of inference generation that occurring over time and/or unexpectedly. Consequently, embodiments disclosed herein may facilitate inference generation in challenging environments.

Figure 5:
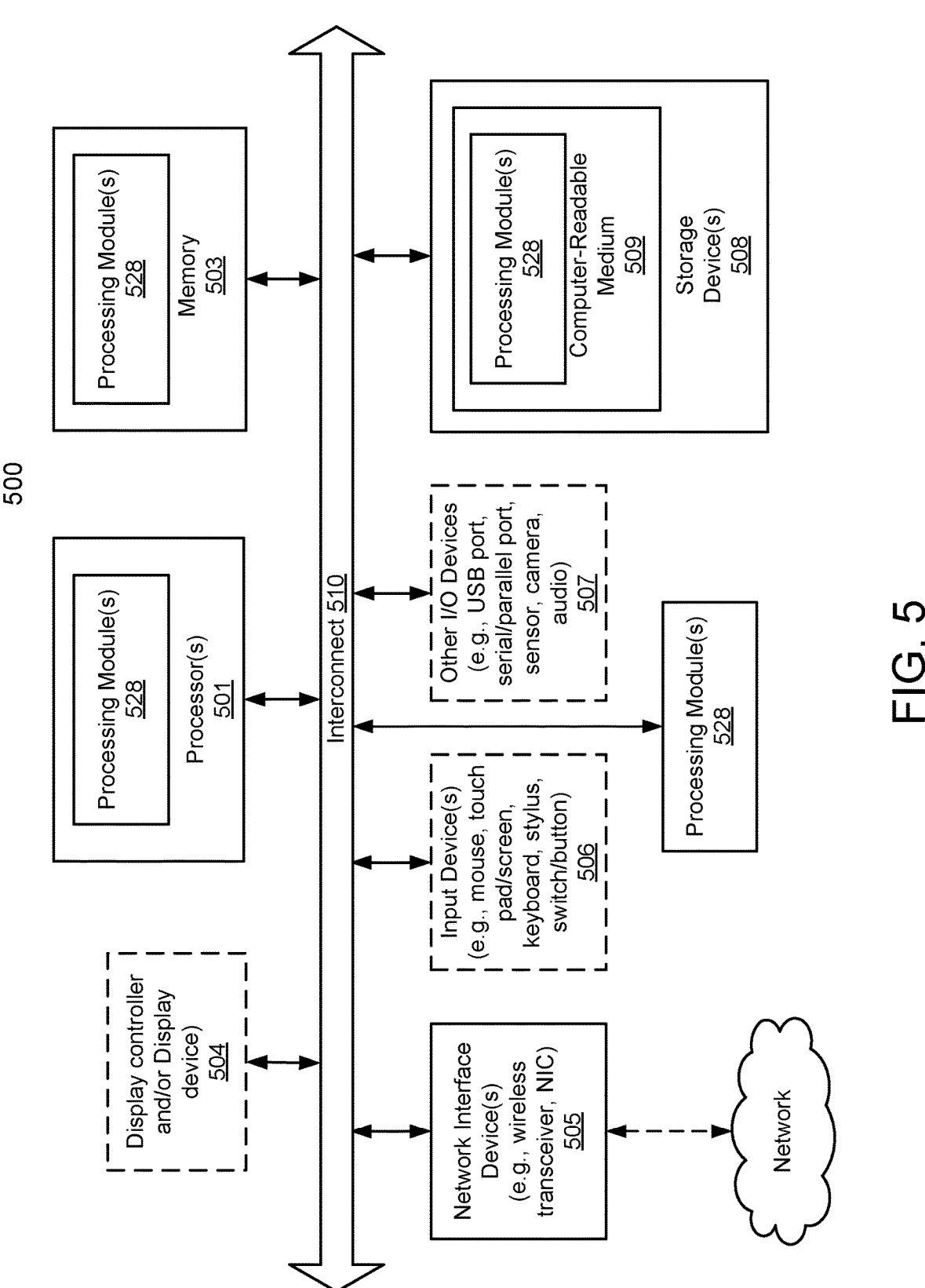
FIG. 5 shows a block diagram illustrating a data processing system in accordance with an embodiment.

Any of the components illustrated in FIGS. 1-4C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows© operating system from Microsoft©, Mac OS©/iOS© from Apple, Android© from Google©, Linux©, Unix©, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor

501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing execution of an inference model hosted by data processing systems, the method comprising:

obtaining an execution plan for inference generation according to inference generation requirements of a downstream consumer, the execution plan designating a time interval to each of the data processing systems for transmitting operational capability data;

obtaining communication system information for a communication system connecting the data processing systems;

making a determination regarding whether the communication system information meets the inference generation requirements;

in an instance of the determination, in which the communication system information does not meet the inference generation requirements of the downstream consumer:

obtaining an inference generation path for the inference model based on the inference generation requirements of the downstream consumer and the communication system information; and modifying a deployment of the inference model to the data processing systems based on the inference generation path.

2. The method of claim 1, further comprising:

prior to obtaining the communication system information: obtaining the inference model;

obtaining characteristics of the inference model and characteristics of the data processing systems; and obtaining portions of the inference model based on the characteristics of the data processing systems and the characteristics of the inference model; and distributing the portions of the inference model to the data processing systems based on the execution plan, wherein the execution plan is obtained based on the portions of the inference model, the characteristics of the data processing systems, and the inference generation requirements of the downstream consumer.

3. The method of claim 2, wherein the communication system information comprises:

a quantity of available communication system bandwidth between each data processing system of the data processing systems; and a reliability of transmission between each data processing system of the data processing systems.

4. The method of claim 3, wherein the reliability of transmission is based on:

historical data indicating a likelihood of successful transmission of data between each data processing system of the data processing systems; or a distance between each data processing system of the data processing systems.

5. The method of claim 4, wherein the inference generation requirements of the downstream consumer are based on:

an inference generation speed threshold, and an inference generation reliability threshold.

6. The method of claim 5, wherein the inference generation speed threshold indicates a minimum quantity of communication bandwidth between each data processing system of the data processing systems to meet the inference generation requirements of the downstream consumer.

7. The method of claim 6, wherein the inference generation reliability threshold indicates a minimum likelihood of successful transmission of data between each data processing system of the data processing systems to meet the inference generation requirements of the downstream consumer.

8. The method of claim 7, wherein the inference generation path comprises:

a listing of instances of each of the portions of the inference model usable to generate an inference model result in compliance with the inference generation requirements of the downstream consumer; and an ordering of the listing of the instances.

9. The method of claim 8, wherein modifying the deployment of the inference model comprises:

generating an updated execution plan based on the inference generation path; and distributing the updated execution plan to the data processing systems to implement the updated execution plan.

10. The method of claim 9, wherein the communication system comprises:

multiple point-to-point wireless connections between the data processing systems, each point-to-point wireless connection of the multiple point-to-point wireless connections having distinct characteristics.

11. A non-transitory machine-readable medium having instructions stored therein, which when executed by a processor, cause the processor to perform operations for managing execution of an inference model hosted by data processing systems, the operations comprising:

obtaining an execution plan for inference generation according to inference generation requirements of a downstream consumer, the execution plan designating a time interval to each of the data processing systems for transmitting operational capability data;

obtaining communication system information for a communication system connecting the data processing systems;

making a determination regarding whether the communication system information meets the inference generation requirements;

in an instance of the determination, in which the communication system information does not meet the inference generation requirements of the downstream consumer:

obtaining an inference generation path for the inference model based on the inference generation requirements of the downstream consumer and the communication system information; and modifying a deployment of the inference model to the data processing systems based on the inference generation path.

12. The non-transitory machine-readable medium of claim 11, the operations further comprising:

prior to obtaining the communication system information: obtaining the inference model;

obtaining characteristics of the inference model and characteristics of the data processing systems;

obtaining portions of the inference model based on the characteristics of the data processing systems and the characteristics of the inference model; and distributing the portions of the inference model to the data processing systems based on the execution plan, wherein the execution plan is obtained based on the portions of the inference model, the characteristics of the data processing systems, and the inference generation requirements of the downstream consumer.

13. The non-transitory machine-readable medium of claim 12, wherein the communication system information comprises:

a quantity of available communication system bandwidth between each data processing system of the data processing systems; and a reliability of transmission between each data processing system of the data processing systems.

14. The non-transitory machine-readable medium of claim 13, wherein the reliability of transmission is based on:

historical data indicating a likelihood of successful transmission of data between each data processing system of the data processing systems; or a distance between each data processing system of the data processing systems.

15. The non-transitory machine-readable medium of claim 14, wherein the inference generation requirements of the downstream consumer are based on:

an inference generation speed threshold, and an inference generation reliability threshold.

16. A data processing system, comprising:

a processor; and a memory coupled to the processor to store instructions, which when executed by the processor, cause the processor to perform operations for managing execution of an inference model hosted by data processing systems, the operations comprising:

obtaining an execution plan for inference generation according to inference generation requirements of a downstream consumer, the execution plan designating a time interval to each of the data processing systems for transmitting operational capability data;

obtaining communication system information for a communication system connecting the data processing systems;

making a determination regarding whether the communication system information meets the inference generation requirements;

in an instance of the determination, in which the communication system information does not meet the inference generation requirements;

obtaining an inference generation path for the inference model based on the inference generation requirements of the downstream consumer and the communication system information; and modifying a deployment of the inference model to the data processing systems based on the inference generation path.

17. The data processing system of claim 16, the operations further comprising:

prior to obtaining the communication system information:

obtaining the inference model;

obtaining characteristics of the inference model and characteristics of the data processing systems;

obtaining portions of the inference model based on the characteristics of the data processing systems and the characteristics of the inference model; and distributing the portions of the inference model to the data processing systems based on the execution plan, wherein the execution plan is obtained based on the portions of the inference model, the characteristics of the data processing systems, and the inference generation requirements of the downstream consumer.

18. The data processing system of claim 17, wherein the communication system information comprises:

a quantity of available communication system bandwidth between each data processing system of the data processing systems; and a reliability of transmission between each data processing system of the data processing systems.

19. The data processing system of claim 18, wherein the reliability of transmission is based on:

historical data indicating a likelihood of successful transmission of data between each data processing system of the data processing systems; or a distance between each data processing system of the data processing systems.

20. The data processing system of claim 19, wherein the inference generation requirements of the downstream consumer are based on:

an inference generation speed threshold, and an inference generation reliability threshold.

\* \* \* \* \*